Feb. 23, 1926.
O. RUTH
1,574,447
TIRE HOLDER
Filed Feb. 16, 1925
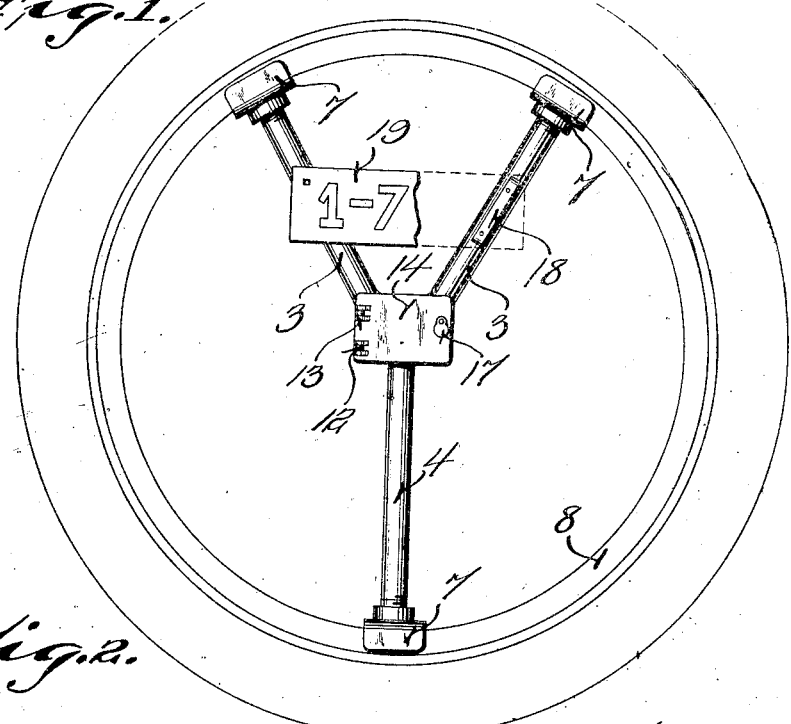
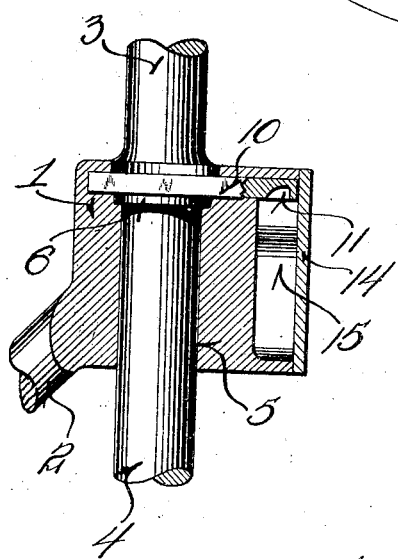
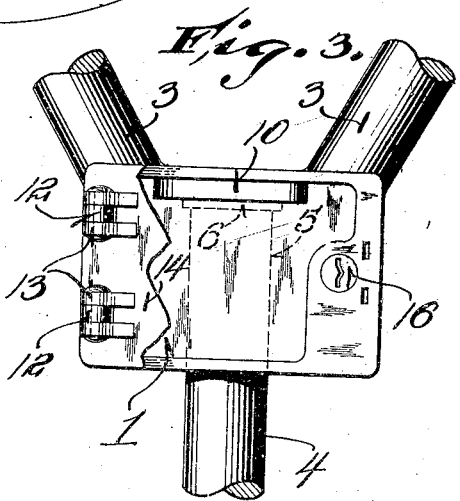
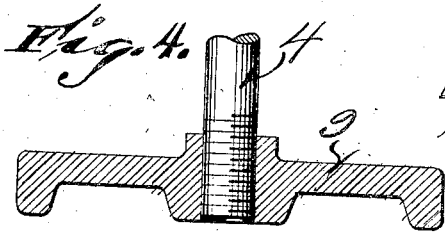
Inventor
Omer Ruth Patented Feb. 23, 1926.

1,574,447

UNITED STATES PATENT OFFICE.

OMER RUTH, OF RACINE, WISCONSIN.

TIRE HOLDER.

Application filed February 16, 1925. Serial No. 9,495.

*To all whom it may concern:*

Be it known that I, OMER RUTH, a citizen of the United States, and resident of Racine, in the county of Racine and State of Wisconsin, have invented certain new and useful Improvements in Tire Holders; and I do hereby declare that the following is a full, clear, and exact description thereof.

This invention relates to tire holders.

Objects of this invention are to provide a tire holder which is adapted to be supported from an automobile, and which is so constructed that a plurality of arms are provided for engaging the rim of a tire at spaced points, with one of the arms slidably mounted within the support and associated with a lock in such a manner that it may be securely locked against sliding motion to thereby lock the tire upon the holder.

Further objects are to provide a tire holder in which a support equipped with a hub portion is provided with rigidly mounted arms for engaging the tire rim at spaced parts and with a slidable arm adapted to slide through the hub when detaching the tire rim, and to provide strong and substantial locking means located within the hub and adapted to be positioned across the inner end of the slidable arm, and to provide each of the arms at their outer ends with removable rim engaging members which may be changed so as to adapt the tire carrier for one or more tires.

An embodiment of the invention is shown in the accompanying drawings, in which:—

Figure 1 is a view of the tire holder.

Figure 2 is an enlarged sectional view through the central portion of the holder.

Figure 3 is a front view partly in section of the structure shown in Figure 2.

Figure 4 is a sectional view illustrating a shoe for the reception of a pair of tires.

Referring to the drawings, it will be seen that a main hub 1 is provided with an integral support 2 extending therefrom and adapted to be secured to an automobile in any suitable manner. The hub is provided with a pair of rigidly and permanently secured arms 3 which may be integral therewith if desired, and which extend outwardly therefrom in a divergent manner. The hub is further provided with a movable rod or arm 4 which slidably fits the transverse aperture 5 (see Figure 2). This aperture, it will be noted is enlarged at its upper end to accommodate the flanged end 6 of the movable rod 4.

Each of the arms or rods 3 and 4 are preferably threaded at their outer end and carry shoes 7 which are screwed upon such threaded ends. These shoes may be designed for the reception of a single tire rim 8 if desired, or they may be formed, as shown in Figure 4, and indicated by the reference character 9, for the reception of a plurality of tire rims. Thus the holder may be quickly changed so that it may carry one or more tire rims as desired.

Means are provided for holding the rod 4 against sliding motion. This means preferably comprises a relatively heavy plate or plunger 10 which is mounted within a suitably recessed portion of the hub 1, as shown in Figures 2 and 3, and is adapted to be slid transversely across the inner end of the rod 4. It is to be noted that the slide 10 engages the body portion of the hub on each side of the inner end of the rod 4, as shown in Figure 2. Thus a very secure and firm locking construction is attained and one which will resist at any time an attempt to slide the rod inwardly. The outer end of this slide 10 is recessed, as indicated at 11 in Figure 2, to provide an aperture for the reception of the operator's finger tips to permit the ready withdrawal of the slide when it is desired to release the rod 4.

From reference to Figure 3, it will be seen that lugs 12 are integrally formed with the body portion 1 of the hub, and that these lugs are connected by pintle pins with spaced lugs 13 of a swinging door 14. This door is secured by any suitable type of lock 15 built within the body portion of the hub 1 and provided with a key receiving portion 16, as shown in Figure 3. If desired, a small flap 17 may be provided for temporarily closing the key receiving aperture and preventing entrance of mud and dirt. The lock is preferably a spring lock so as to permit the ready locking thereof when the parts are in the desired position.

In using the device, it is merely necessary to unlock the door 14 and swing it open. Thereafter, the operator retracts the slide 10 thus permitting the sliding of the rod 4 through the hub 1 and the removal of the tire and rim.

When it is desired to position a new rim on the holder, the arm 4 is moved outwardly into engagement with the rim, the slide 10 is pushed back and the door is swung shut, thus locking the parts in their tire receiving position. If desired, each of the arms 3 may be provided with a small outwardly spaced strip 18, as indicated in Figure 1, for the reception of a plate 19. This construction provides a neat holder for the license plate or other similar plate, and does not in any way interfere with the free action of the tire holder.

It will be seen that a tire holder has been provided which is of very substantial and serviceable construction, which is relatively simple, and which is provided with removably carried tire rim engaging shoes.

It will be seen further that the device may be very quickly and easily operated to either lock a tire in position or to release a tire from the holder.

It is to be noted further that if desired, the arms 3 may extend upwardly, as shown in Figure 1, to thus provide a support for the tire so that it may be positioned thereon and, thereafter, free and unhindered movement of the slidable arm may be had while the weight of the tire is carried by the arms 3. This construction affords great freedom to the operator in manipulating the tires, either in placing them on the holder or removing them therefrom, as he does not have to hold the tire in place while he is locking the device or unlocking it.

Although the invention has been described in considerable detail, it is to be understood that the invention may be variously embodied and is, therefore, to be limited only as claimed.

I claim:

1. A tire holder comprising a support having a hub, means rigidly carried by said hub for engaging a portion of a tire rim, a rod slidable through said hub and having means at its outer end for engaging a portion of the tire rim spaced from said first mentioned portion, a plate slidably mounted within said hub and adapted to be slid across the inner end of said rod, a door hinged to said hub and adapted when closed to prevent sliding of said plate, and a lock for temporarily holding said door closed.

2. A tire holder comprising a support having a hub, said hub having a pair of arms extending outwardly therefrom and provided with rim engaging terminal portions, said hub having an aperture therethrough, and having a slot extending transversely across said aperture, a slide removably positioned within said slot and adapted to intercept said aperture, a cover hingedly carried by said hub, a lock for securing said cover against said hub, a rod extending through said aperture and adapted to abut said slide and having a rim engaging member at its outer end.

In testimony that I claim the foregoing I have hereunto set my hand at Milwaukee, in the county of Milwaukee and State of Wisconsin.

OMER RUTH.